(12) United States Patent
Niere et al.

(10) Patent No.: US 8,701,079 B2
(45) Date of Patent: Apr. 15, 2014

(54) PROCEDURE AND DEVELOPMENT ENVIRONMENT FOR GENERATION OF AN EXECUTABLE OVERALL CONTROL PROGRAM

(75) Inventors: Jörg Niere, Horn-Bad Meinberg (DE); Carsten Schmidt, Herford (DE); Wolfgang Trautmann, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 202 days.

(21) Appl. No.: 12/954,979

(22) Filed: Nov. 29, 2010

(65) Prior Publication Data

US 2011/0138353 A1 Jun. 9, 2011

(30) Foreign Application Priority Data

Dec. 3, 2009 (EP) .................................. 09015018

(51) Int. Cl.
*G06F 9/44* (2006.01)
(52) U.S. Cl.
USPC ........................................ 717/104; 717/120
(58) Field of Classification Search
USPC ........................................................ 717/104
See application file for complete search history.

(56) References Cited

U.S. PATENT DOCUMENTS

| | | | |
|---|---|---|---|
| 6,851,104 B1 * | 2/2005 | Rodrigues da Silva | 717/104 |
| 7,149,734 B2 * | 12/2006 | Carlson et al. | 1/1 |
| 7,650,589 B2 * | 1/2010 | Cifra | 717/105 |
| 7,761,844 B2 * | 7/2010 | Bove et al. | 717/106 |

(Continued)

FOREIGN PATENT DOCUMENTS

| EP | 1 522 910 A1 | 4/2005 |
|---|---|---|
| EP | 1 746 499 A1 | 1/2007 |

OTHER PUBLICATIONS

DSpace, dSpace Data Dictionary, Basic Concepts Guide, Target Link 3.0 (Published Jul. 2008).*
European Search Report for EP09015018.6 (machine translation).

(Continued)

*Primary Examiner* — Don Wong
*Assistant Examiner* — Theodore Hebert
(74) *Attorney, Agent, or Firm* — Orrick Herrington & Sutcliffe, LLP

(57) ABSTRACT

A procedure for generating an executable overall control program such as a measurement, control, regulation and/or calibration is illustrated and described for controlling a control system having at least one electronic processor unit, whereby multiple functional model components of one of the functional models describing the functionality of the overall control program are compiled in data code, the data elements used in the functional model components are listed at least partially in one of the various data element sets of the functional model. References between data elements in the data element set and those functional model components of the functional model in which the data elements are used are registered, and these references are saved as additional reference information. Such data elements in the data element sets, which are assigned to multiple functional model components are grouped as common data elements in at least one data element group, and at least a part of the data elements in the data element set is compiled to data code. The data code for common data elements is generated from the data set independently of the functional model, and the function code and the data code are completely merged and compiled into the executable overall control program using the reference information consistently.

12 Claims, 7 Drawing Sheets

(56) References Cited

U.S. PATENT DOCUMENTS

Figure 1:
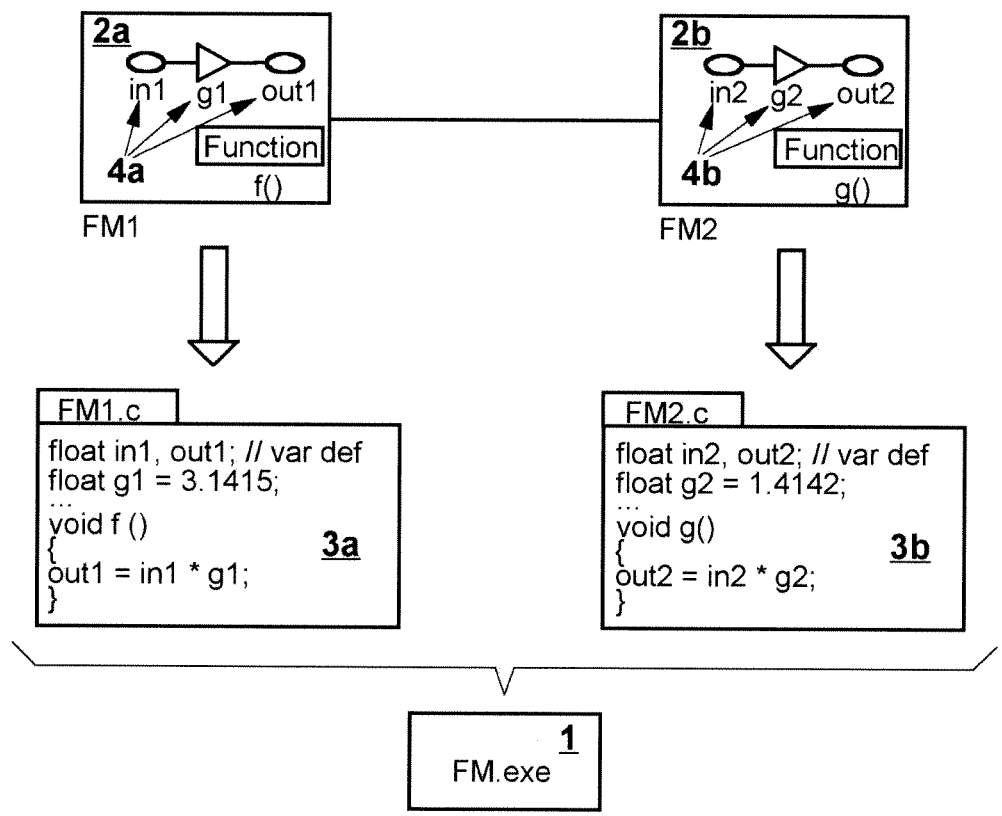

| | | | |
|---|---|---|---|
| 2007/0006131 A1* | 1/2007 | Kiffmeier et al. | 717/104 |
| 2008/0091279 A1* | 4/2008 | Biermann et al. | 700/17 |
| 2010/0192122 A1* | 7/2010 | Esfahan et al. | 717/105 |
| 2010/0229151 A1* | 9/2010 | Yuan et al. | 717/104 |
| 2010/0235809 A1* | 9/2010 | Rath et al. | 717/105 |
| 2011/0138353 A1* | 6/2011 | Niere et al. | 717/104 |

OTHER PUBLICATIONS

Uwe Honekamp et al., "Component—Node—Network: Three Levels of Optimized Code Generation with ASCET-SD", Proceedings of the 1999 IEEE, International Symposium on Computer Aided Control System Design, Kohala Coast-Island of Hawai'i Hawai'i, USA, Aug. 22-27, 1999, pp. 243-248.

dSpace Data Dictionary, Basic Concepts Guide, TargetLink 3.0—Jul. 2008, pp. 1-154.

Tom Erkkinen, "Model Style Guidelines for Flight Code Generation", The MathWorks Inc., Novi, MI, 48375, American Institute of Aeronautics and Astronautics, pp. 1-8. Aug. 15, 2005-Aug. 18, 2005.

Data Declaration System V5.6, Visual Information Technologies GmbH, DDS V5.6 Product Data Sheet, pp. 1-3. Jul. 21, 2009, http://www.visu-it.com/dds.

Data Declaration System, "What's new in Version 5.6.R1?", 6 pages, May 7, 2009, http://www.visu-it.de/dds.

TargetLInk, Advanced Practices Guide, TargetLink 2.1, 630 pages, Aug. 2005.

dSpace TargetLink, Production Code Generation Guide, TargetLink 3.0—Jun. 2009 (538 pages).

dSpace TargetLink, Advanced Practices Guide, TargetLink 3.0—Jul. 2008 (732 pages).

* cited by examiner

PROCEDURE AND DEVELOPMENT ENVIRONMENT FOR GENERATION OF AN EXECUTABLE OVERALL CONTROL PROGRAM

CROSS REFERENCE TO RELATED APPLICATIONS

The subject application claims priority to European Patent Application No. 09015018.6 filed Dec. 3, 2009.

FIELD OF THE INVENTION

The subject invention relates to a process for generating an executable overall control program, such as a measurement, control, regulation and/or calibration program, for controlling a control system having at least one electronic processor unit, whereby multiple functional model components of a functional model describing the functionality of the overall control program are compiled to function code. The data elements used in the functional model components are listed at least partially in a data element set which is different from the functional model, i.e., separate from the functional model, —not an integral part of the functional model—an independent tool not belonging to the functional model whereby references between data elements in the data element set and those functional model components of the functional model in which the data elements are used are registered, and these references are saved as additional reference information, whereby such data elements in the data element sets which are assigned to multiple functional model components are grouped as common data elements in at least one data element group and at least a part of the data elements in the data element set is compiled to data code.

The subject invention also relates to a development environment for the generation of an executable overall control program for the control of a controller system having at least one electronic processor unit, with at least one development computer, at least one modeling unit, at least one data element management unit and at least one function code generating unit, whereby at least one functional model component of one functional model describing the functionality of the overall control program can be modeled using the modeling unit running on the development computer, and the functional model components can be compiled to function code with the help of the function code generating unit, the data elements used in the functional model components with the help of the data management unit can be managed and listed in the data element set which is different from the functional model, whereby references between data elements in the data element set and those functional model components of the functional model in which the data elements are used can be registered using the modeling unit, whereby these references are saved as additional reference information and such data elements in the data element set that are assigned to multiple functional model components can be grouped as common data elements in at least one data element group using the data element management unit, and at least a part of the data elements in the data element set can be compiled to data code.

BRIEF DESCRIPTION OF THE INVENTION

The procedure and development environment of the general type mentioned above have become reasonably widespread in the course of the last few years when it comes to automated code generation for control systems, mostly real-time systems. Often—depending on the degree of complexity of the controller system—one or more controller devices are used as the processor units and these controller devices generally have corresponding I/O interfaces, in order to be able to acquire the status parameters of the physically technical system to be controlled with the help of measurement systems, and in order to be able to control the physically technical system with the help of output of specific control or set-point parameters.

The benefit of such procedures is that the desired functionality of the overall control program can be modeled at an abstract level, for example, in the form of block diagrams, which facilitate the representation of highly complicated mathematical and structural correlations in a very simple manner. Even I/O functionalities can be represented within the scope of such a functional model. By using the procedure mentioned above, it is basically possible to generate code for the very specialized hardware of the electronic processor, with the code being compiled in the overall control program, which can then be executed and tested on this target hardware. The need for manual and error-prone implementation of a control concept in a overall control program system can be obviated, whereby the presently common fast development cycles, for example, within the framework of rapid-controlling prototyping or hardware-in-the-loop simulations have now become possible.

In many cases, the functional model—merely on account of the complexity of many models and control & regulation tasks associated with them—is divided into multiple functional model components, which are handled and processed by different developers or development groups. In the case of an automobile, for example, the functional model components can be the functional models of the drive assembly, drive (or power) train and automobile structure, whereby each of these functional model components, in turn, can be broken down into lower order functional model components. Since these functional model components all belong to a uniform and standard functional model, these functional model components generally have interfaces, over which the functional model components exchange those status parameters via which the functional model components are coupled. Other status parameters are visible only within a functional model component and are not exchanged between functional model components. Comparable to this situation, there are often also such parameters of the functional model, which are used in multiple functional models, just as there are those parameters, whose use is exclusively local within a single functional model component. All these parameters in totality are referred to as data elements here.

In order to get a consolidated overview of all data elements used in the functional model, the data elements used in the functional model components may be listed and managed in a data element set which is different from the functional model; the data element set, thus, is not part of a functional model component, but instead, a separate unit additional to the functional model components. A certain consistency between the data elements used in the functional model components and the data elements registered in the data element set is ensured by additionally recording references between the data elements of the data element set and the functional model components of the functional model in which these data elements are used. These references are saved as additional reference information.

Over and above this, it is possible to group those data elements of a data element set that are assigned to multiple functional model components into a data element group—or naturally, to group them in multiple data element groups—as common data elements; examples of such data elements are the interface status parameters and cross-model parameters mentioned above. While the function code already described may be generated from the functional model components, it is now possible within the framework of code generation for a functional model component to generate corresponding data code for that part of the data elements which have been grouped as common data elements in the data set and are contained in the corresponding functional model component. The data code obtained and the function code obtained from the functional model components should be overall complete, unique and consistent for error-free creation of the executable overall control program.

For example, it has been contemplated to generate function code separately for each functional model component, whereby, for example, all definitions of data elements which are relevant to this functional model component are generated in the function code of the corresponding functional model component. This is no problem at all, provided that the definitions pertain to data elements that occur exclusively in the corresponding functional model component. If only the function code of a single functional model component needs to be generated and tested, the generation of declarations and definitions of such data elements which are actually used in multiple functional model components is also not a problem, since even the codegeneration for common data elements, owing to the singular code generation for only one functional model component, can also result in only one definition of common data elements. Where references from the functional model component point to the data element set, these references are used at the time of generating the data code, as a result of which, in any case, it is ensured that a common data element is also used uniformly by other functional model components.

If, however, the function code is generated not only for a single functional model component, but instead, for multiple functional model components, multiple definitions of data elements occur quickly, if the data code of common data elements is generated for each functional model component. Moreover, the generation of data code is incomplete if the common data elements are grouped in such a manner that they, in fact, are generated in separate data code—thus, for example, in a separate header file—, if, however, no functional model component contains all these common data elements of the corresponding data element group. This is because while generating code from a functional model, code is generated only for those data elements that are referred to from the corresponding functional model component.

Hence, in accordance with one aspect of the invention there is provided a complete and unique generation of data code for a functional model for generating an integral overall control program.

This may be achieved with the help of the procedure described initially for generating an executable overall control program by generating the data code for common data elements from the data element set independently of the functional model, and by completely and, using the reference information, consistently merging and compiling the function code and data code for the creation of the executable overall control program.

In accordance with one aspect of the invention, there is provided a process that generates the data code for common data elements depending on whether the common data elements are available in the data element set. In this manner, no common data element is overlaid by subsequent functional model-dependent generation of data code, and the data code, thus, becomes incomplete, and, exactly in the same manner, it is prevented that multiple definitions of common data code occur, since almost every functional model component regenerates the data code for each common data element used, as a result of which multiple definitions have to occur.

When it is said that the data code for common data elements is generated from the data set independently of the functional model, it can be understood that not only the data code for each common data element is generated which is referenced from a certain functional model component, but instead, that the data code may be generated by using all common data elements that are stored necessarily in the set of data elements. The generation of data code for common data elements may take place so that they are no longer selective with respect to the functional model components and the references contained therein in the data element set, but instead, independent of these functional model components and make full use of all the information regarding the common data elements in the data element set, for example, selectively with respect to a data element group.

In accordance with another aspect of the invention, common data elements may be first defined in the data element set and these common data elements are only then used in the functional model components with the help of references to the common data elements defined in the data element set. This measure necessitates that actually identical data elements from the data element group of the common data elements are used and that different versions of a single desired common data element are not created inadvertently in various functional model components.

In accordance with another aspect of the invention, particular benefits may be seen when the data code representing the data elements of a given data element group is generated respectively in a separate data code module, that is, for instance, in a header file, which includes the corresponding declarations and/or definitions of the data elements of this data element group. As a result, a module-type of code structure may be ensured on the whole, which is comprehensible and easy to maintain. It is conceivable, for example, that a data element group is provided with a certain name in the data element set and all the data elements of this data element group are then generated in one data code module, whereby the data code module bears the name of the data element group.

Another contemplated benefit in accordance with another aspect of the invention, is when the common data elements realizing the communication between functional model components are grouped at least partially in one interface data element group and, either additionally or alternatively, the common data elements used as parameters in functional model components are grouped in a parameter data element group. In this manner, the data elements can be easily separated from one another which, on the one hand, deal with the communication between functional model components, and those, on the other hand, which are independent of the communication.

In accordance with another aspect of the invention, different variants of common data elements may be defined in the data element set and, either additionally or alternatively, variants of data element groups of common data elements are defined and corresponding variants of data code are generated at the time of compilation.

In accordance with another aspect of the invention, it is useful to take different variants into consideration while generating the overall control program, since the formation of variants facilitates testing of different functional or parameter-based variations within a single functional model in a very simple manner, without having to maintain various independent functional models for this purpose. This becomes clear, for example, when one control system needs to be tested on the basis of different sets of calibration parameters, whereby it should not be necessary to create a separate and independent model for each set of calibration parameters. In this case, it is far more practical and, in accordance with another aspect of the invention, it is contemplated that different parameter data element groups are marked as variants, which can then be replaced with one another.

In accordance with another aspect of the invention, it is contemplated with the variants management described above, that the time point at which a particular variant is selected in the course of the generation of the overall control program is specified, whether the variants are already selected at the code generation—and the unused variants should be discarded—or, whether, under other extreme circumstances, all variants should be saved in the overall control program and can be selected during run-time. Thus, the time point of selection of the variant to be used amongst all the variants available is specified in the data element set, namely, whether the variant to be used is selected while generating the data code, while compiling the data code to the executable overall control program or at the time of execution of the overall control program. In the process, depending on the selection time point, appropriate data code is generated automatically and a corresponding executable overall control program is compiled.

The creation of a overall control program from a functional model and a data element set can involve a considerable amount of time. In the case of more complex models, tens of thousands of code lines may be generated, which need to be translated by corresponding compilers for the target hardware. Such a process can take many hours of time. As long as the procedure is carried out in this manner that the data code representing the data elements of a data element group are generated in a separate data code module respectively, the procedure may be continued to be used in such a manner that after changing the data elements in the data element set, only the data code modules of those data element groups are regenerated, which contain the data elements that have changed. As a result, regeneration of a large part of the function and data code that has already been generated can be avoided, which results in substantial savings in time.

Another aspect of the subject invention relates to a computer program with program code resources for the purpose of carrying out all the steps with the help of the procedure described above if the program is executed on a data processing system, which is typically the case in practice. In addition, the invention relates to a computer program with program code resources which can be saved on computer-readable data media.

In accordance with another aspect of the invention, the task indicated with the development environment represented initially for generating an executable overall control program may be achieved in a manner in which the data code for common data elements from the data set can be generated using a data code generating unit independently of the functional model, and the function code and data code can be merged and compiled consistently by using the reference information for the creation of the executable overall control program. Having said that the development environment has been set up in a certain manner so that a given action can be carried out, it is meant that this development environment is specifically suitable and has been set up for performing this action and not merely that it has the abstract suitability for this purpose.

BRIEF DESCRIPTION OF THE DRAWINGS AND FIGURES

Figure 2:
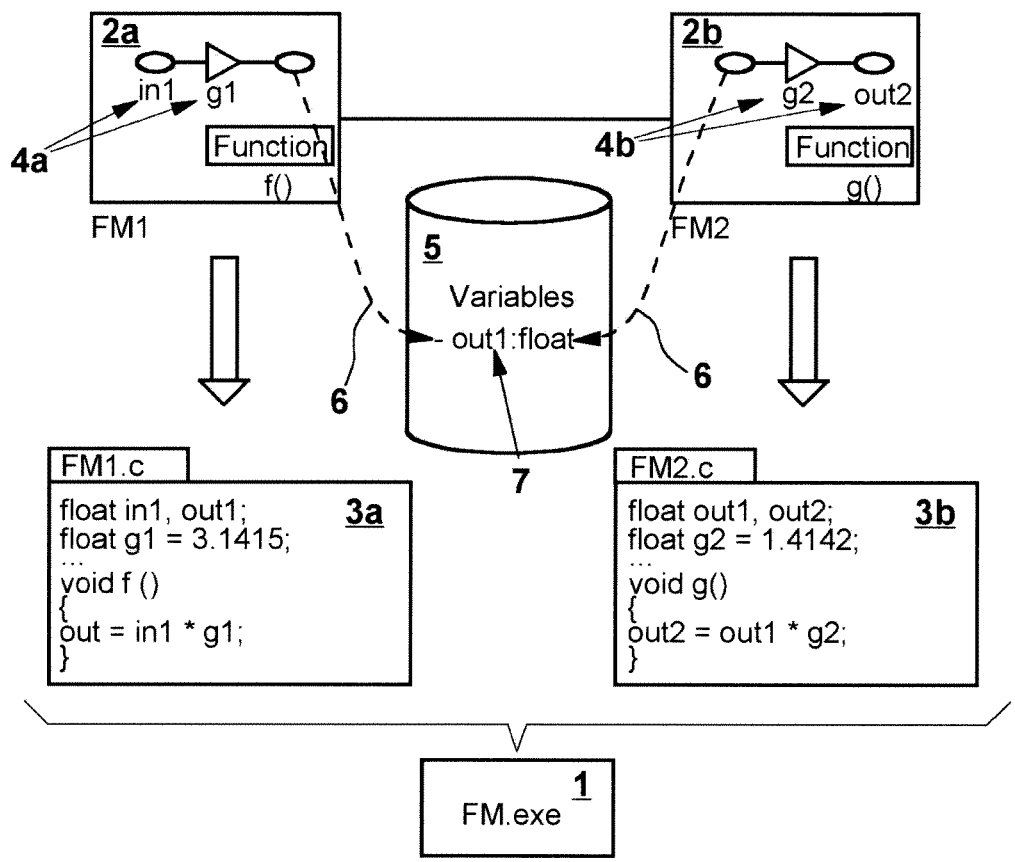
Figure 3:
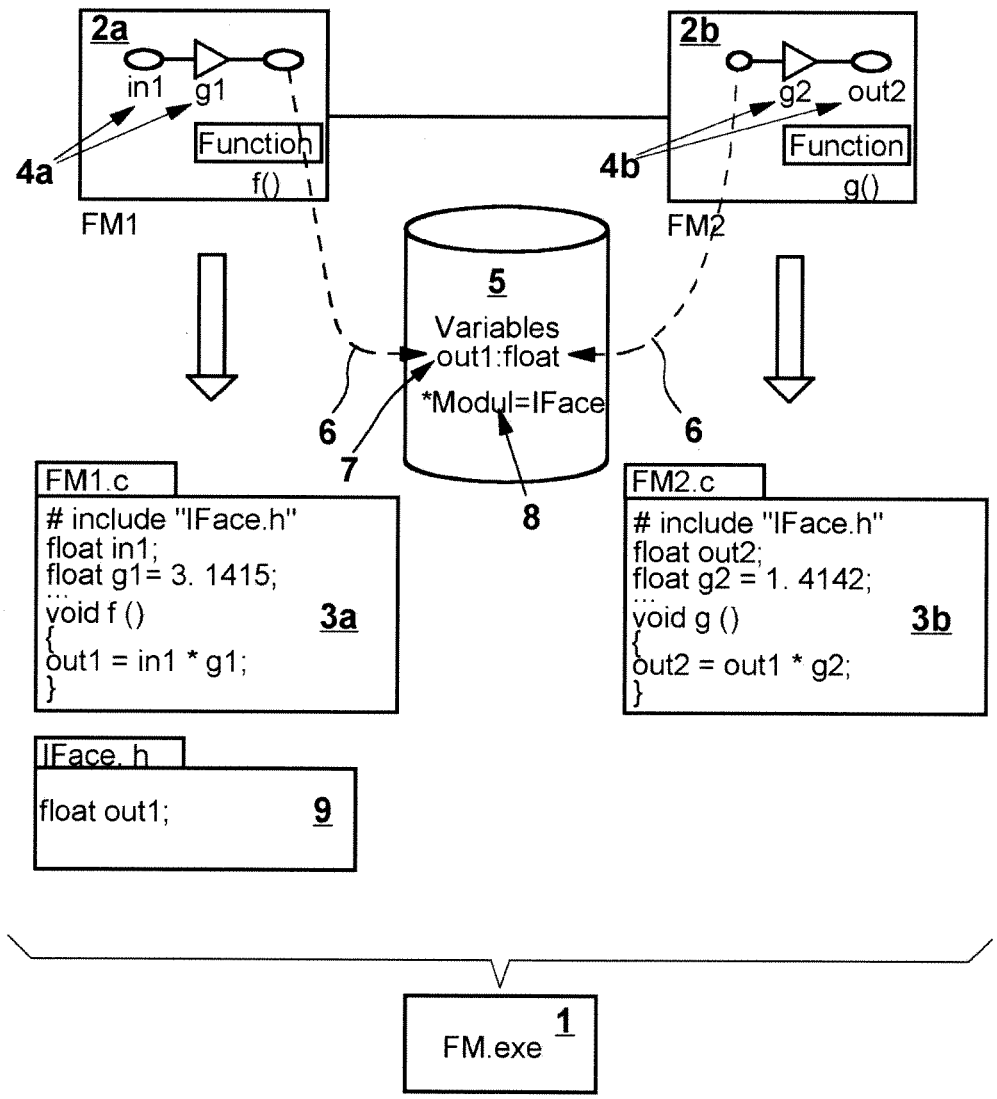
Figure 4:
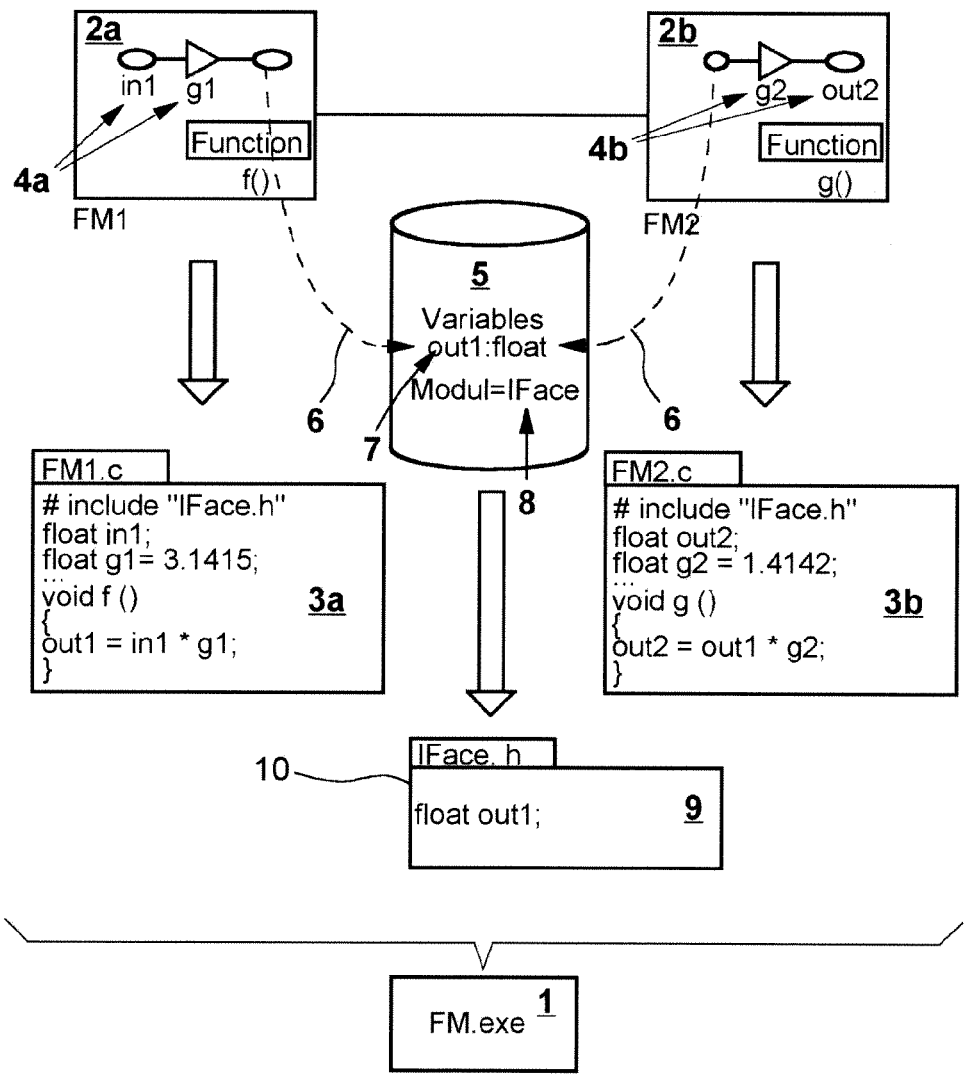
Figure 5:
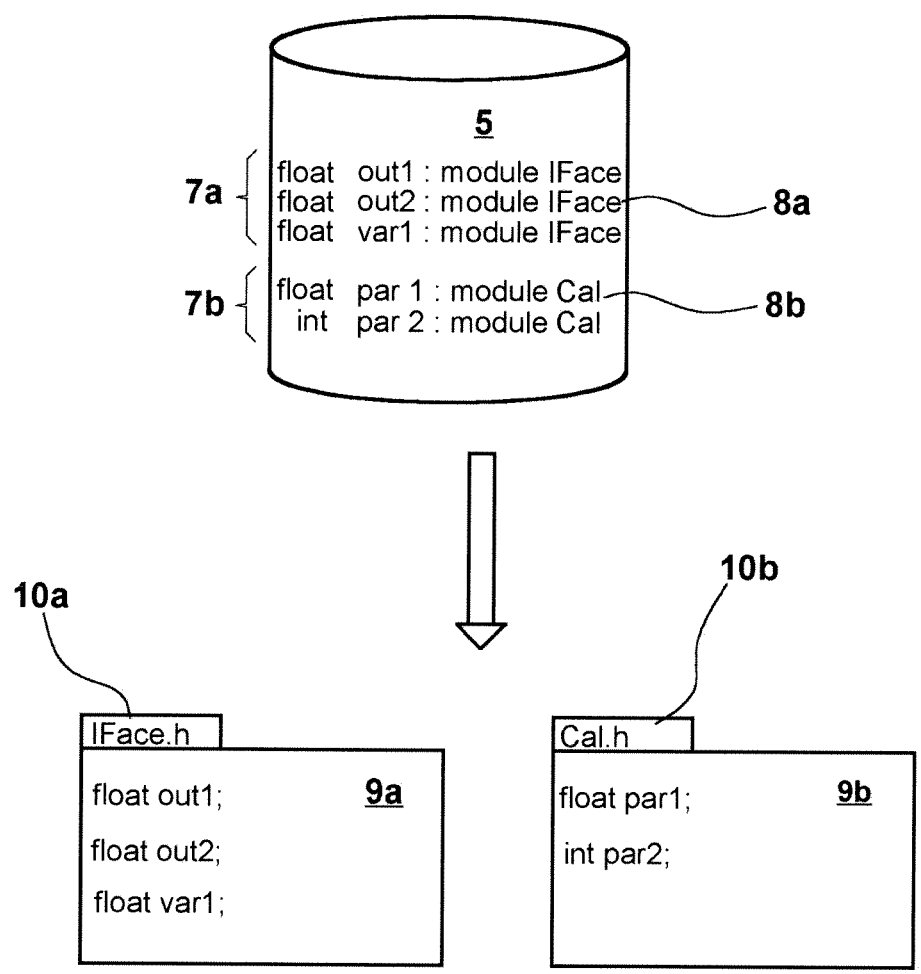
Figure 6:
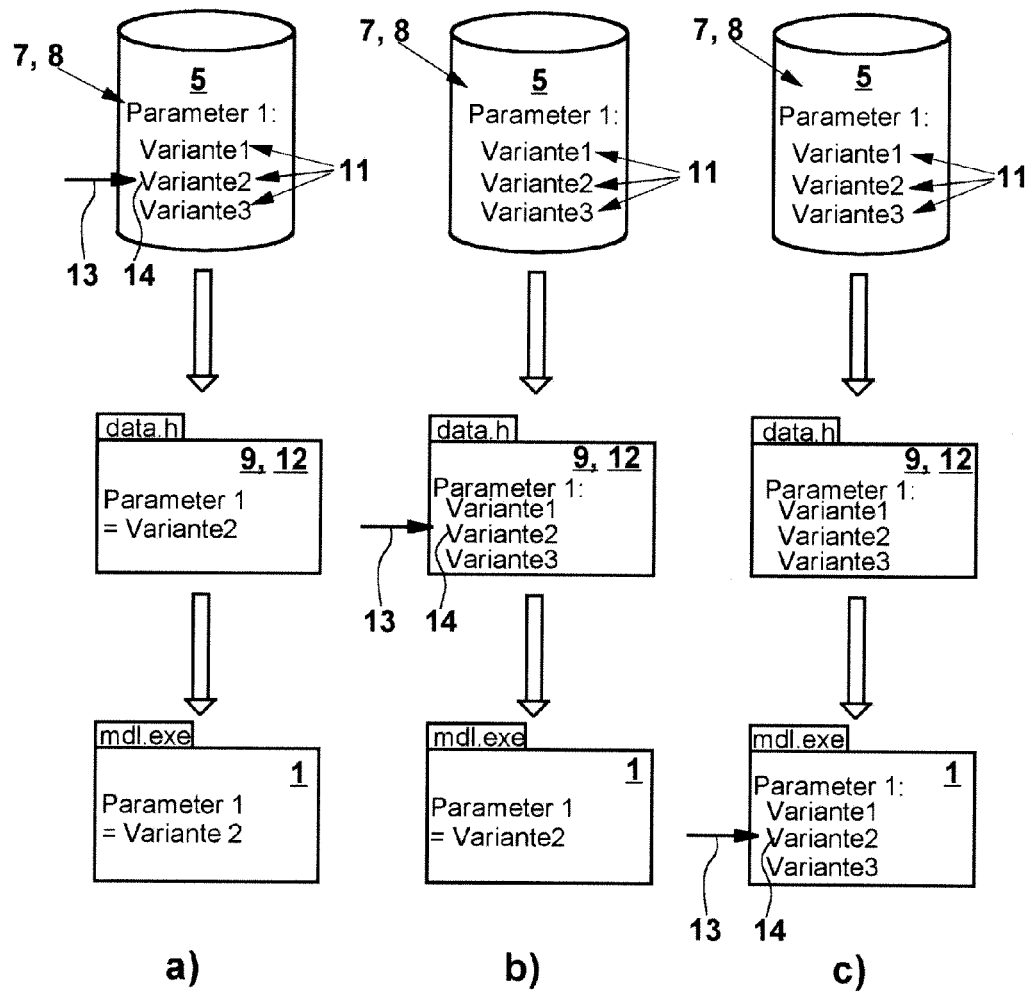
Figure 7:
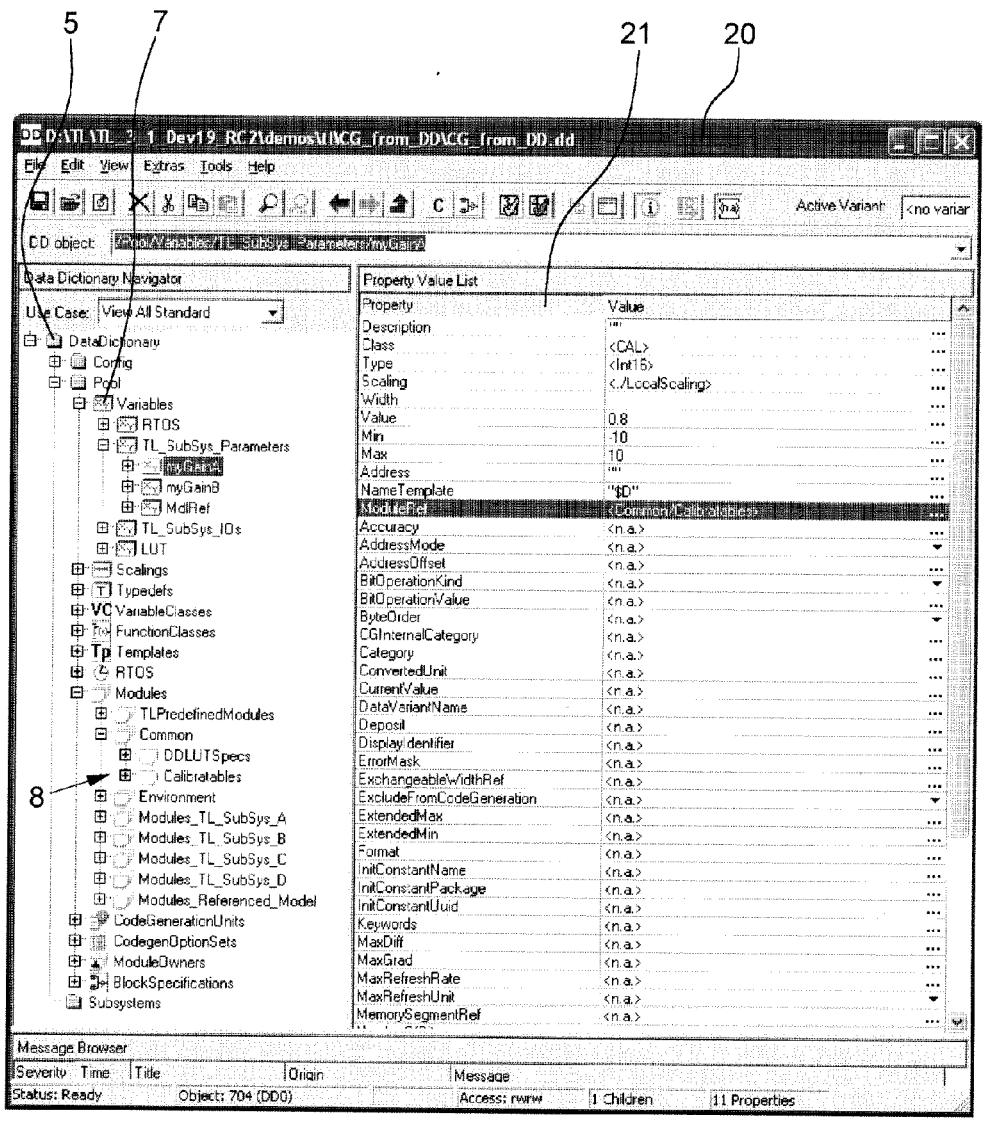

For the purpose of illustration, and not intended to be limiting in any way, reference is drawn to the following descriptions of examples of implementation in conjunction with the drawings. The set of drawings include and illustrate as follows:

FIG. 1 a procedure for the generation of an executable overall control program using the prior art, FIG. 2 another procedure for the generation of an executable overall control program using the prior art, FIG. 3 another alternative procedure for the generation of an executable overall control program using the prior art and with the help of a data element set, FIG. 4 the representation of the procedure in accordance with the patent for the generation of an executable overall control program, FIG. 5 another representation of the procedure in accordance with the patent with data code modules generated separately and independently, FIG. 6 the procedure in accordance with the patent for handling variants of data elements and FIG. 7 the representation of a part of the development environment in accordance with the patent.

DESCRIPTION OF THE EMBODIMENTS

The FIGS. 1 to 3 provide a schematic illustration of a prior art procedure for the generation of an executable overall control program 1, which, in the cases illustrated here, is a technical control program, and serves to control a control system using an electronic processor unit (not illustrated in the present embodiment). In the present case, the processor unit is a programmable controller respectively having corresponding I/O modules, as is used in the automotive sector in a number of design variants within a single automobile.

A functional model 2 describes at a high level of abstraction—using the block diagrams indicated schematically—the functionality of the overall control program 1, whereby the functional model 2 includes multiple functional model components 2a, 2b, or respectively, is divided into these functional model components 2a, 2b. The functional model components 2a, 2b are compiled into function code 3a, 3b. The modeling of the functional model components 2a, 2b can be carried out independently of one another on entirely different development computers, whereby, however, it must always be taken into consideration that the functional model components 2a, 2b exchange data between one another, which is indicated in the present case in the FIGS. 1 to 5 by a thin connecting line.

FIG. 1 illustrates that the function code 3a is generated from the functional model component 2a and the function code 3b is generated from the functional model component 2b. As can be seen in FIG. 1, the function code 3a, 3b generated from each functional model component 2a, 2b is complete in the sense that all data elements 4a, 4b used in the respective functional model components 2a, 2b are included completely in the function code 3a, 3b. However, the function code 3a does not contain the data elements 4b of the functional model component 2b, just as the function code 3b does not contain the data elements 4a of the functional model component 2a.

Based on the function code 3a, 3b illustrated in FIG. 1 it is evident in any case that prior to generating the resultant overall control program 1, certain "framework" code must be generated in advance, which establishes the link between the function code 3a for the functional model component 2a and the function code 3b for the functional model component 2b. Primarily, this framework code must invoke the function f( ) before the function g( ), whereby the output parameter out1 of the data element 4a must be assigned to the input parameter in2 in the data element 4b between the calls to these two functions. If data elements having identical names are used in the functional model components 2a, 2b, there is double declaration and definition of the data elements 4a, 4b in the function code 3a, 3b, which inevitably results in error messages while compiling the function code 3a, 3b.

In the case of the procedure illustrated in FIG. 2 using the prior art, at least a part of the data elements 4a, 4b used in the functional model components 2a, 2b are listed in a data element set 5 different from the functional model component 2, in the form of the variable out 1 in the present case, which is a floating number. At the same time, the references 6 between the data elements 7 of the data element set 5 and those functional model components 2a, 2b of the functional model component 2 are registered, in which the data elements 7 are used; these references 6 are saved as additional reference information.

If, now, as already known from FIG. 1, the function code 3a, 3b is generated from the functional model components 2a, 2b, this takes place taking into account the references 6 from the functional model components 2a, 2b into the data element set 5, as a result of which common data elements 7, which are assigned to the functional model components 2a, 2b, are used uniformly, as can be seen in the function code 3a, 3b. Now, as a matter of fact, ambiguous and contradictory definitions of data elements are prevented, but however, the undesirable multiple declarations of—the variable out1 in this case—cannot be prevented, which leads to an error message in the latest case at the time of generating the overall control program 1.

FIG. 3 finally illustrates that such data elements 7 in the data element set 5 that are assigned to multiple functional model components 2a, 2b are grouped as common data elements in a data element group 8—identified here as "IFace"—and are compiled in data code 9. In the Figures, all data elements 7 listed in the data element set 5 are such data elements, which are assigned to multiple functional model components 2a, 2b and, hence, also represent common data elements. The data element set 5, however, can also have data elements that are not used commonly, and allocate these data elements to various data element groups, which, however, is not of great significance in the present case.

The grouping of common data elements takes place in FIG. 3 by assigning a module name to the data elements, which is called "IFace" here. If compilation of one of the functional model components 2a, 2b is initiated, the data code 9 is also generated along with the compilation process of the respective functional model component 2a, 2b. Here, too, it is possible that the data code 9 is generated more than once, but, again, it is also possible that versions having different scopes of the data code 9 are generated, whereby the last version of data code 9 generated is possibly overlaid on the previous versions of the data code 9. This is the case, for example, if the data code 9 is generated with both the compilation process for the functional model component 2a and the compilation process for the functional model component 2b, and the version of the header file Iface.h last generated, overlays the version generated previously. Different scopes of the versions of data code 9 can occur, for example, if there are more variables having the module name assignment "IFace" in the functional model component 2a than in the functional model component 2b. Finally, it can be concluded that the procedures known from the prior art and represented in the FIGS. 1 to 3 for generating an executable overall control program 1 have various disadvantages with respect to the generation of data code for a overall control program 1.

FIG. 4 illustrates the procedure, in accordance with another aspect of the invention, for the generation of an executable overall control program 1, that permits consistent, complete, unique and non-overlaid generation of data code 9, in which, namely, the data code 9 for the common data elements of the data set 5 is generated independently of the functional model 2, 2a, 2b, and the function code 3a, 3b and the data code 9, with the help of the common data elements and the reference information are merged and compiled completely and consistently to an executable overall control program 1. The procedure illustrated in FIG. 4, thus, dispenses with the generation of the data code 9 linked with the functional model 2 or the functional model components 2a, 2b, and the data code, in complete contrast, is merely generated completely with the help of the information stored in the data element set 5, regarding the data elements 7, so that the data code 9—contained here in the header file "IFace.h"—possibly contains more definitions of the data elements 7, than would be necessary for the execution of only one of the functional model components 2a, 2b or the corresponding function code 3a, 3b, but, however, the data code 9 is, in any case, complete, unique and non-overlapping with respect to the overall control program 1.

In the procedure illustrated in FIG. 4, the data elements 7, acting as common data elements, are defined in the data element set 5, whereby these common data elements 7 can be used only thereafter in the functional model components 2a, 2b, in the present case, by the references 6 to the common data elements 7 defined in the data element set 5. As a result, it is automatically prevented that separate and different definitions are created in the functional model components 2a, 2b for identical common data elements, which can then lead to conflicts in the common data element set 5.

It has been shown to be particularly clear when the data code 9, 9a and 9b, representing the data elements 7, 7a and 7b of a data element group 8a, 8b is generated in a separate data code module 10, 10a and 10b respectively, which is illustrated as a single data code module 10 in FIG. 4, and which is evident in FIG. 5 on the basis of two data element groups 8a, 8b and data code 9a, 9b corresponding to these data element groups 8a, 8b, in the separate data code modules 10a, 10b, whereby the separate data code modules 10a, 10b are the header files "IFace.h" and "Cal.h".

In FIG. 5, the common data elements 7a realizing the communication between the functional model components 2a, 2b are grouped in an interface data element group 8a, having the name "IFace", and the common data elements 7b used as parameters in the functional model components 2a, 2b are grouped in a parameter data element group 8b, which bears the name "Cal". By means of such separation it is possible, in the event of changes affecting merely the communication between the functional model components 2a, 2b, to replace selectively only the corresponding data code module 10a, so that all the data elements 7 of data code 9 do not have to be regenerated, which results in considerable savings in time. In all, it is beneficial to regenerate only the data code module 10 of those data element groups 8, which contain data elements 7 that have changed after these have been changed in the data element set 5.

FIG. 6 depicts the procedure for the generation of an executable overall control program 1, which enables the management of variants in a simple manner in accordance with another aspect of the invention. For this purpose, different variants 11 in the data element set 5 of a data element group 8 have been defined in the form of "Parameter 1"; variants 11 of individual common data elements 7 can be defined in exactly the same way. In the present case, these variants 11 are different parameter sets of combustion engine tuning, which need to be tested in connection with an engine controller realized by the overall control program 1. As can be seen in the FIGS. 6a, 6b and 6c, the variants 11 are defined in the form of variant1, variant2 and variant3 of the data element group 8 in the data element set 5 and compiled in data code variants 12. With the help of the procedure illustrated, it is also possible to specify the selection time point 13 of the variant 14 to be used from the total possible and different variants 11.

FIG. 6a illustrates that the selection time point 13 lies already before the process of compiling the data elements 7 or the data element group 8 into the data code 9. As a matter of fact, the variants 11 of the data element group 8 in the data element set 5 are already defined in the form of variant1, variant2 and variant3 for parameter1, but however, the selection of the variant 14 to be used is already in the data element set 5, so that the result of the compilation process is a variant-free data code 12. Since this data code 9 or variant data code 12 is already variant-free, the overall control program 1 resulting from them is necessarily also variant-free.

However, the situation in FIG. 6b is different. It has been specified here that the selection of the variants takes place only after the compilation of the data element 7 or the data element group 8 into the data code 9, so that the variant data code 12 has all variants of parameter1, that is, variant1, variant2 and variant 3. By means of suitable control of the compilation procedure of the data code 9 or the variants data code 12, which results in the generation of the overall control program 1, the variant 14 to be used is now selected in the form of variant2 from the variants data code 12. This control is exercised with the help of so-called pre-processor instructions. Here, too, the result is that the overall control program 1 has merely one single variant of the data element group 8 of parameter1, namely variant2.

In FIG. 6c, all variants 11 from the data element set 5 are incorporated in the executable overall control program 1, whereby it is possible to select between different variants 11 during run-time. The software structures required for the selection are generated automatically by the procedure depicted in FIG. 6; pre-processor instructions for this purpose are generated automatically in the procedure in accordance with FIG. 6b and switch statements are generated automatically in the code for the execution of the procedure in accordance with FIG. 6c.

FIG. 7 partially illustrates a part of the development environment for the generation of an executable overall control program 1, namely a data element management unit 20, with which it is possible to manage data element set 5, which is different from the functional model 2, or, more precisely, to list and manage the data elements 7 used in the functional model components 2a, 2b in the data element set 5.

The data element set 5 designated as "DataDictionary" in FIG. 7 contains not only common data elements 8 as data elements 7, but also overall a data-related description of the variables and parameters from the functional model 2, which are listed and classified under "Variables" as data elements 7. Various parameters of the functional model component that is not shown are listed in the section "TL_SubSys_Parameters" having the name TL_SubSys_Parameters, namely in the form of the parameters, "myGainA" and "myGainB".

Various properties can be specified for the data elements 7 listed under "Variables" in the list field 21 of the data element management unit 20. As can be seen from the dark background (phantom cursor) of the text "MyGainA" in FIG. 7, this data element 7 has been selected so that the corresponding properties of the data element 7 can be set in the list field 21. As can be seen from the list field 21, the data element "MyGainA" is assigned to the data element group "Calibratables", which can be seen from the internal reference "ModuleRef" to the data element group 8, "Calibratables". The parameters of the functional model 2 necessary for the calibration are grouped in the data element group 8, "Calibratables". The data element group is created here as an independent object of the data element set. With the assignment of the data element 7 to this object as shown, the data element 7, "MyGainA" is defined as belonging to the data element group 8, "Calibratables".

The invention claimed is:

1. A process for generating an executable overall control program for controlling a control system having at least one electronic processor unit, comprising:
   generating a set of function code from a plurality of functional model components,
   wherein the functional model components are part of a functional model that describes the functionality of the overall control program;
   listing one or more data elements used in the functional model components in a data element set, wherein the data element set is distinct from the functional model and the set of function code;
   registering references between one or more of the data elements in the data element set and the functional model components that use the data element;
   saving the registered references as additional reference information;
   grouping the data elements in the data element set that are assigned to multiple functional model components as common data elements in at least one data element group;
   generating a set of data code from a plurality of the data elements in at least one data element group, such that the data code generation occurs independently of the generation of the set of function code for the functional model components and uses common data elements in the data element group; and
   merging and compiling the set of function code and the set of data code completely and consistently into the executable overall control program using the additional reference information.

2. The process in accordance with claim 1, wherein the common data elements are defined in the data element set, and wherein the common data elements are used in the functional model components only using the definitions in the data element set.

3. The process in accordance with claim 1, wherein the set of data code representing the data elements of the data element group is generated in a separate data code module.

4. The process in accordance with claim 1, wherein one or more of the common data elements accomplishing communication between functional model components are grouped in an interface data element group.

5. The process in accordance with claim 1, wherein different variants of common data elements in the data element set are defined and corresponding data code for the variants is generated at the time of generation.

6. The process in accordance with claim 5, wherein in the data element set, the selection time point of the variant to be used from the different variants is specified, as (a) whether the variant to be used is selected while generating the set of data code, or (b) while merging and compiling the set of data code into the executable overall control program or (c) while executing the overall control program, and whereby the corresponding data code is generated automatically depending on the time point of selection, and a corresponding executable overall control program is compiled.

7. A process in accordance with claim 4 wherein after one or more data elements in the data element set change, only the set of data code modules of those data element groups containing changed data elements are regenerated.

8. A non-transitory computer readable medium containing program code resources configured to cause a data processing system to generate an executable overall control program for controlling a control system having at least one electronic processor unit, by performing a method comprising:
   generating a set of function code from a plurality of functional model components,
   wherein the functional model components are part of a functional model that describes the functionality of the overall control program;
   listing one or more data elements used in the functional model components in a data element set, wherein the data element set is distinct from the functional model and the set of function code;
   registering references between one or more of the data elements in the data element set and the functional model components that use the data element;
   saving the registered references as additional reference information;
   grouping the data elements in the data element set that are assigned to multiple functional model components as common data elements in at least one data element group;
   generating a set of data code from a plurality of the data elements in at least one data element group, such that the data code generation occurs independently of the generation of the set of function code for the functional model components and uses common data elements in the data element group; and
   merging and compiling the set of function code and the set of data code completely and consistently into the executable overall control program using the additional reference information.

9. A development environment for the generation of an executable overall control program for controlling a control system having at least one electronic processor unit comprising:
   at least one development computer,
   a modeling unit running on one of the at least one development computers and configured to model at least one functional model component of a functional model describing the functionality of the overall control program,
   a data element management unit running on one of the at least one development computers and configured to
   manage the data elements used in the functional model components, and
   create a data element set, wherein the data element set is distinct from the functional model and the set of function code, and lists the data elements;
   a function code generation unit running on one of the at least one development computers and configured to generate a set of function code from the functional model components,
   wherein the modeling unit is further configured to register references between data elements in the data element set and those functional model components that use the data elements, and save the references as additional reference information
   wherein the data element management unit is further configured to group data elements that are assigned to multiple functional model components as common data elements in at least one data element group in the data element set, and wherein
   a data code generation unit generates a set of data code from the data elements in at least one data element group, such that the data code generation occurs independently of the generation of the set of function code for the functional model components and uses common data elements in the data element group, and
   wherein the set of function code and the set of data code are completely merged and compiled consistently into the executable overall control program using the reference information.

10. The process in accordance with claim 1, wherein the common data elements used as parameters in the functional model components are grouped in a parameter data element group.

11. The process in accordance with claim 1, wherein variants of data element groups of common data elements are defined and corresponding data code for the variants is generated at the time of the data code generation.

12. The process in accordance with claim 11, wherein in the data element set, the selection time point of the variant to be used from the different variants is specified, as (a) whether the variant to be used is selected while generating the data code, or (b) while merging and compiling the data code to the executable overall control program or (c) while executing the overall control program, and whereby the corresponding data code is generated automatically depending on the time point of selection, and a corresponding executable overall control program is compiled.

* * * * *